United States Patent [19]

Djiauw et al.

[11] Patent Number: 4,794,132

[45] Date of Patent: * Dec. 27, 1988

[54] LOW SMOKE POLYPROPYLENE INSULATION COMPOSITIONS

[75] Inventors: Lie K. Djiauw, Houston, Tex.; Ronald D. Icenogle, Spokane, Wash.

[73] Assignee: Shell Oil Company, Houston, Tex.

[*] Notice: The portion of the term of this patent subsequent to Nov. 11, 2003 has been disclaimed.

[21] Appl. No.: 947,054

[22] Filed: Dec. 29, 1986

[51] Int. Cl.[4] .......................... C08K 9/04; C08K 9/06; C08K 3/22

[52] U.S. Cl. .................................... 523/200; 523/212; 524/436; 524/505; 524/504

[58] Field of Search ............... 523/200, 202, 203, 212; 524/436, 505

[56] References Cited

U.S. PATENT DOCUMENTS

| | | | |
|---|---|---|---|
| 3,113,986 | 12/1963 | Breslow et al. | 260/683.9 |
| 3,251,095 | 5/1966 | Cadenhead | 19/80 |
| 3,251,905 | 5/1966 | Zelinski | 260/879 |
| 3,265,765 | 8/1966 | Holden et al. | 260/876 |
| 3,390,207 | 6/1968 | Moss et al. | 260/879 |
| 3,480,580 | 11/1969 | Joyner et al. | 260/29.6 |
| 3,481,910 | 12/1969 | Brunson | 260/78.4 |
| 3,598,887 | 8/1971 | Darcy et al. | 260/879 |
| 3,639,521 | 2/1972 | Hsieh | 260/880 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,292,414 | 9/1981 | Saito et al. | 525/255 |
| 4,427,828 | 1/1984 | Hergenrother et al. | 525/66 |
| 4,578,429 | 3/1986 | Gergen et al. | 525/291 |
| 4,622,350 | 11/1986 | Icenogle et al. | 524/436 |
| 4,622,352 | 11/1986 | Djiauw et al. | 524/436 |

Primary Examiner—John C. Bleutge
Assistant Examiner—David W. Woodward

[57] ABSTRACT

This invention relates to a resin composition comprising polypropylene, a functionalized hydrogenated mono alkylarene-conjugated diene block copolymer, oil, and a treated $Mg(OH)_2$ filler which can be blended to form a self-extinguishing, low smoke and halogen free insulation composition which exhibits high stress at break and is relatively easy to process.

18 Claims, No Drawings

LOW SMOKE POLYPROPYLENE INSULATION COMPOSITIONS

This invention relates to a resin composition comprising polypropylene, a modified hydrogenated mono alkylarene-conjugated diene block copolymer, oil, and a treated $Mg(OH)_2$ filler which can be blended to form a self-extinguishing, low smoke and halogen free insulation composition which exhibits high stress at break and is relatively easy to process.

BACKGROUND OF THE INVENTION

The most common method for reducing the flammability of wire and cable insulation and jacketing materials is the use of an organic bromine or chlorine compound along with antimony oxide. This system is very effective as a flame retardant, but such materials produce a dense black smoke when burned, and also produce hydrogen chloride or hydrogen bromide, which are both corrosive and toxic. Because of this, there has been a great deal of interest in flame retarded systems that produce lower amounts of smoke and toxic and corrosive gases when they are burned. There appear to be two main approaches that are being followed to meet this goal. The first is to eliminate halogens from the system and use instead large loadings of alumina trihydrate, another common fire retardant, or the similar filler magnesium hydroxide. The second is to develop additives that reduce the smoke and acid gas production of the halogenated systems. In addition to low smoke low toxicity these compositions must also have attractive physical properties in order to be used for wire and cable applications. These properties include hardness, abrasion resistance, environmental stability, deformation resistance, low temperature flexibility, oil resistance and good electrical properties. At present there are no low-smoke, low-toxicity, flame-retardant materials which are readily available although some new materials including metal hydrate filled polyethylene are becoming available.

Metal hydrates such as alumina trihydrate and magnesium hydroxide contain water bonded to a crystal structure with the metal atom. When heated to a sufficiently high temperature these compounds decompose and release water which subsequently vaporizes. This process of decomposition and vaporization absorbs heat, thus slowing down the initial heating of the insulation material and consequently slows down the subsequent burning of the material. After this cooling effect is overwhelmed however, the presence of the metal hydrates has little effect on the subsequent process of burning. Unlike the halogenated flame retardant composition, metal hydrate compositions with non-halogenated polyolefins break down quickly into monomer units and burn relatively cleanly without a great deal of smoke production. In addition, since metal hydrates only add water to the system, they should not increase the emission of toxic or corrosive gases beyond what already would be produced by the system.

Polypropylene, which is readily available at a reasonable cost, has found many industrial uses because of its desirable physical properties, such as ease of fabrication by all conventional methods; high melting point of stereoregular, e.g., isotactic, polypropylene and compatibility with many other commercial resins, which permits a large number of blends having specific properties. Brittleness in these compositions can be reduced either by copolymerizing propylene with ethylene to form block copolymers or by blending homopolypropylene with rubbers.

It is well known in the art that physical properties of these blends can be greatly enhanced by the incorporation of hydrogenated monoalkyl arene-conjugated diene block copolymers.

It has been discovered that adding a modified (functionalized) block copolymer greatly enhances the physical properties of these blends. It is believed that the functionalized block copolymer provides for bonding between the polymer matrix and the filler.

Magnesium hydroxide fillers along with alumina trihydrate fillers have been used in flame retardant polypropylene compositions. Alumina trihydrate is generally more effective as a flame retardant than is magnesium hydroxide due to the greater amount of water incorporated in that filler, however, magnesium hydroxide has specific advantages, for example, better processability when incorporated into a polyolefin composition and a higher decomposition temperature than alumina trihydrate (330° C. versus 230° C.). This increase decomposition temperature allows a flame retardant polymer composition containing magnesium hydroxide to be processed at a higher temperature than a compound with alumina trihydrate. The higher processing temperatures allow much faster processing due to lower viscosities.

It has been found however that conventional magnesium hydroxide fillers cannot be successfully blended into rubber modified polypropylene compositions. These compositions when filled to a reasonable loading of magnesium hydroxide cannot be processed due to agglomeration of the filler particles. Accordingly, it would be desirable to provide a magnesium hydroxide filler which would not adversely affect the processability by agglomeration.

SUMMARY OF THE INVENTION

According to the present invention there is provided a blend containing polypropylene, functionalized hydrogenated monovinyl arene-conjugated block copolymer, oil and a filler having good physical properties, good processability, good flame retardancy and low production of toxic and corrosive gases when burned. More particularly, said composition comprises (1) between about 1 and about 40 weight percent of a homopolypropylene, (2) between 5 and 40 percent by weight of a functionalized hydrogenated monoalkyl arene-(A)-conjugated diene (B) block copolymer containing at least two A blocks and at least one B block, (3) between 1 and about 20 percent by weight of a hydrocarbon extending oil, and (4) between about 10 and about 85 percent by weight of a magnesium hydroxide filler which has been surface treated with a coupling agent.

DETAILED DESCRIPTION OF THE INVENTION

The compositions of the present invention are prepared by combining the required components in the correct porportions in conventional blending equipment such as a rubber mill or mixer, for example, a Banbury mixer. This is usually done above the melting temperature of the polymeric materials.

FUNCTIONALIZED BLOCK COPOLYMERS

Block copolymers of conjugated dienes and vinyl aromatic hydrocarbons which may be utilized include any of those which exhibit elastomeric properties and those which have 1,2-microstructure contents prior to hydrogenation of from about 7% to about 100%. These block copolymers need not be hydrogenated however the hydrogenated polymers are preferred. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial symetric or asymetric and which have structures represented by the formulae, A—B, A—B—A, A—B—A—B, B—A, B—A—B, (AB)$_{0-50}$BA and the like wherein A is a polymer block of a vinyl aromatic hydrocarbon or a conjugated diene/vinyl aromatic hydrocarbon tapered copolymer block and B is a polymer block of a conjugated diene.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,095; 3,265,765; 3,639,521 and 4,208,356 the disclosures of which are incorporated herein by reference.

Conjugated dienes which may be utilized to prepare the polymers and copolymers are those having from 4 to 8 carbon atoms and include 1,3-butadiene, 2-methyl-1,3-butadiene(isoprene), 2,3-dimethyl-1,3-butadiene, 1,3-pentadiene, 1,3-hexadiene, and the like. Mixtures of such conjugated dienes may also be used. The preferred conjugated diene is 1,3-butadiene.

Vinyl aromatic hydrocarbons which may be utilized to prepare copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

It should be observed that the above-described polymers and copolymers may, if desired, be readily prepared by the methods set forth above. However, since many of these polymers and copolymers are commercially avaiable, it is usually preferred to employ the commercially available polymer as this serves to reduce the number of processing steps involved in the overall process. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

These block copolymers can be functionalized as described by Gergen in U.S. Pat. No. 4,578,429, which is hereby incorporated by reference, or by other methods which are well known in the prior art, e.g. Saito et al U.S. Pat. No. 4,292,414 and Hergenrother et al U.S. Pat. No. 4,427,828. The functionalized block copolymer is a thermally stable modified selectively hydrogenated high 1,2 content block copolymer wherein at least one acid compound is grafted to the block copolymer (base polymer).

More preferably, the functionalized block copolymer is a functionalized selectively hydrogenated block copolymer selected from the group consisting of AB diblock copolymers and multiblock copolymers having at least two blocks A and at least one block B to which has been grafted an acid compound or its derivative wherein, (1) each A is predominantly a polymerized monoalkenyl aromatic hydrocarbon block having an average molecular weight of about 2,000 to 115,000;
(2) each B is predominantly a polymerized conjugated diene hydrocarbon block having an average molecular weight of about 20,000 to 450,000;
(3) the blocks A constituting 5–95 weight percent of the copolymer;
(4) the unsturation of the block B is reduced to less than 10% of the original unsaturation;
(5) the unsaturation of the A blocks is above 50% of the original unsaturation.

The preferred modifying monomers for use in functionalization are those which are reactive with polyamides and may include unsaturated mono- and polycarboxylic-containing acids ($C_3$–$C_{10}$) with preferably at least one olefinic unsaturation, and anhydrides, salts, esters, amides, thiols, thioacids, glycidyl, hydroxy, glycol, and other substituted derivatives from said acid.

Examples of such acids, anhydrides and derivatives thereof include maleic acid, fumaric acid, itaconic acid, citraconic acid, acrylic acid, glycidyl acrylate, cyanoacrylates, hydroxy $C_1$–$C_{20}$ alkyl methacrylates, acrylic polyethers, acrylic anhydride, methacrylic acid, crotonic acid, isocrotonic acid, mesaconic acid, angelic acid, maleic anhydride, itaconic anhydride, citraconic anhydride, sodium acrylate, calcium acrylate, and magnesium acrylate.

Other monomers which can be used either by themselves or in combination with one or more of the carboxylic acids or derivatives thereof include $C_2$–$C_{50}$ vinyl monomers such as acrylamide, and monovinyl aromatic compounds, i.e. styrene, chlorostyrenes, bromostyrenes, α-methyl styrene, vinyl pyridenes and the like.

Other monomers which can be used are $C_4$ to $C_{50}$ vinyl esters, vinyl ethers and allyl ethers, such as vinyl butyrate, vinyl laurate, vinyl stearate, vinyl adipate and the like, the monomers having two or more vinyl groups, such as divinyl benzene, ethylene dimethacrylate, triallyl phosphite, dialkylcyanurate and triallyl cyanurate.

The preferred monomers to be grafted to the block copolymers according to the present invention are maleic anhydride, maleic acid, fumaric acid and their derivatives. It is well known in the art that these monomers do not polymerize easily.

Of course, mixtures of monomer can be also added so as to achieve graft copolymers in which the graft chains contain at least two different monomers (in addition to the base polymer monomers). The functionalized block copolymers can be added to the blend as described or cut back with up to 75% by weight of an unfunctionalized block copolymer.

POLYPROPYLENE

The homopolypropylene preferably should be isotactic and may be, for example, of the type corresponding to Shell PP-5944 S, PP-5520 and PP DX-5088, available from Shell Chemical Company, Houston, Tex. Most commercial isotactic polypropylenes are suitable in the compositions of this invention. Syndiotactic homopolymers also can be used. Modified polypropylenes, for example, maleic anhydride functionalized polypropylene of the type corresponding to Plexar 2110, available from Northern Petrochemical Company, Rolling Meadows, Ill., may also be used in the compositions of this invention. The functionalized polypropylenes are readily prepared according to procedures described in U.S. Pat. Nos. 3,480,580 or 3,481,910, which are hereby incorporated by reference.

FILLERS

The magnesium hydroxide fillers useful in the compositions of the present invention are surface treated with a coupling agent to prevent agglomeration of the particles. When agglomeration occurs the effective particle size of the filler is increased dramatically and therefore the processability and the properties of the end product are degraded. Surfactants which are useful in the invention may include fatty acid salts, for example, oleates and stearates, also maleates, silanes, zircoaluminates, titanates, etc. It has also been found that magnesium hydroxide fillers with a high aspect ratio crystallate shape and larger size are also less likely to agglomerate than those with a lower aspect ratio. Aspect ratios for the crystallites should be greater than 4 and mean secondary particle (agglomerate) size should be less than three microns.

ADDITIONAL COMPONENTS

In addition, the present composition may contain other components such as plasticizers, e.g., saturated hydrocarbon or mineral oils, hydrogenated or saturated hydrocarbon resins along with additives such as stabilizers and oxidation inhibitors. Aliphatic oils and resins are preferred to aromatic oils and resins since aromatics tend to cyclacize resulting in color bodies. Preferred oils are primarily aliphatic, saturated mineral oils. Preferred resins are saturated or hydrogenated hydrocarbon resins, such as hydrogenated polymers of dienes and olefins. These additional components must be compatible with the block copolymer component. The selection of the other components depends upon a number of factors—e.g., the method for coating a wire.

As stated above, the compositions may be modified with supplementary materials such as stabilizers and oxidation inhibitors. Stabilizers and oxidation inhibitors are typically added to the compositions in order to protect the polymers against degradation during preparation and use of the composition. Combinations of stabilizers are often more effective, due to the different mechanisms of degradation to which various polymers are subject. Certain hindered phenols, organo-metallic compounds, aromatic amines and sulfur compounds are useful for this purpose. Especially effective types of these materials include the following:

1. Benzothiazoles, such as 2-(dialkyl-hydroxybenzyl-thio)benzothiazoles.
2. Esters of hydroxybenzyl alcohols, such as benzoates, phthalates, stearates, adipates or acrylates of 3,5-dialkyl-1-hydroxy-benzyl alcohols.
3. Stannous phenyl catecholates.
4. Zinc dialkyl dithiocarbamates.
5. Alkyl phenols, e.g., 2,6-di-tert-butyl-4-methyl phenol.
6. Dilaurylthio-dipropionate (DLTDP). Examples of commercially available antioxidants are "Ionox 220" 4,4-methylene-bis(2,6-di-t-butyl-phenol) and "Ionox 330" 3,4,6-tris(3,5-di-t-butyl-p-hydroxybenzyl)-1,3,5-trimethylbenzene, "Dalpac 4C" 2,6-di-(t-butyl)-p-cresol, "Naugawhite" alkylated bisphenol, "Butyl Zimate" zinc dibutyl dithiocarbamate, and "Agerite Geltrol" alkylated-arylated bisphenolic phosphite. From about 0.01 percent to about 5.0 percent by weight of one or more antioxidants is generally added to the composition.

TABLE I

| | Typical | Preferred | Most Preferred |
|---|---|---|---|
| Block Copolymer (Modified + unmodified) | 5–40 | 10–30 | 15–20 |
| Plasticizer (oil) | 1–20 | 2–15 | 4–8 |
| Polypropylene | 1–40 | 2–20 | 4–8 |
| Filler | 10–85 | 40–75 | 63–75 |

The particular amounts of each component may vary somewhat in the resultant composition depending on the components employed and their relative amounts.

The particular method of preparing the compositions and manufacturing the insulated or jacketed wire and/or cable which are the subject of the present invention is not critical and any of a number of commercially known techniques may be employed both for blending and extruding the modified block copolymer-polypropylene compositions and forming the jacketed and/or insulated wire and/or cable.

The method used to form the blend is not critical provided the polymers are homogeneously dispersed. Incomplete mixing results in the formation of aggregates which impair the physical properties of the blend.

Obviously, other modifications and variations of the present invention are possible in light of the above teachings. It is therefore to be understood that changes may be made in the particular embodiments of the invention described which are within the full intended scope of the invention as defined by the appended claims.

EXAMPLES

The following examples are given to illustrate the invention and are not to be construed as limiting.

The components used were as follows:

Block Copolymer 1 is a S—EB—S with GPC block molecular weights of about 29,000-125,000-29,000.

The modified block copolymer is S—EB—S which GPC block molecular weights of 7,000-35,000-7,000 which has been grafted with about 1.3 weight percent of maleic anhydride.

The oil was Penreco 4434 oil available from Penreco Company. The polypropylene was homopolypropylene PP 5520 or PP 5944 from Shell Chemical Company. The modified polypropylene was a maleic anhydride functionalized polypropylene Plexar 2110 from Northern Petrochemical Company in Rolling Meadows, Ill. The ATH was alumina trihydrate, 1.0 micron precipitated Hydral 710B from Alcoa. The $Mg(OH)_2$ was from Ventron Division of Morton Thiokol Inc. with a secondary particle size of about 4 microns. The surface treated $Mg(OH)_2$ was Kisuma 5B from Kyowa Chemical Industry Ltd., which is oleate treated and has an average secondary (aggregate) particle size of about 0.8 microns.

ANTIOXIDANTS

Irganox 1010; tetra-bismethylene 3-(3,5-ditertbutyl-4 hydroxyphenyl)-propionate methane from Ciba-Geigy. Irganox MD-1024; stabilizers from Ciba-Geigy. DLTDP; Plastanox DLTDP, American Cyanamid. Compositions are in percent by weight.

Examples were extruded insulation coating on 18AWG solid conductor 30 mils samples. All insulation coatings were conducted at 190 deg. C. melt temperature.

Example IC 1132 shows that a blend of block copolymer with polypropylene could not be blended or extruded because of the $Mg(OH)_2$ filler loading. Example LR8506 using a similar amount of an oleate treated $Mg(OH)_2$ was easily processed even though about 30% less polypropylene was incorporated. The blend however had an unacceptable stress at break. Examples IC 1046 and IC 1102 both showed acceptable properties however Examples IC 1102 with treated $Mg(OH)_2$ according to the present invention was much more easily processed than Example IC 1046 containing ATH as indicated by the 50% decrease in power input to the extruder.

TABLE II

|  | IC 1132 | LR 8506 | IC 1046 | IC-1102 |
|---|---|---|---|---|
| Block Copolymer 1 | 14.7 | 16.00 | 11.40 | 4.7 |
| Modified Block Copolymer | — | — | 10.00 | 10.00 |
| Oil | 7.35 | 8.00 | 5.00 | 7.35 |
| Polypropylene 5944 | — | 5.00 | — | — |
| Polypropylene 5520 | — | — | 5.00 | 7.35 |
| Modified Polypropylene | 7.35 | — | — | — |
| ATH | — | — | 68.0 | — |
| $Mg(OH)_2$ | 70.00 | — | — | — |
| Surface Treated $Mg(OH)_2$ | — | 70.40 | — | 70.00 |
| Irganox 1010 | 0.10 | 0.25 | 0.10 | 0.10 |
| Irganox 1024 | 0.10 | 0.10 | 0.10 | 0.10 |
| DLTDP | 0.40 | 0.25 | 0.40 | 0.40 |
| Stress Break (psi) | * | 400 | 2300 | 1450 |
| Elongation at Break (%) | * | 370 | 110 | 120 |
| Line speed (FPM) | * | 250 | — | — |
| Screw speed (RPM) | * | 150 | 20 | 30 |
| Power Input (AMP) | * | 10 | 24.5 | 12.5 |
| Head Pressure (psi) | * | 1340 | — | 2800 |
| Limiting Oxygen Index % | * | 31.0 | 32.0 | 28.5 |

*Could not be coated.

What is claimed is:

1. A flame retardant insulation composition comprising:
   (a) 5-40 percent by weight of a hydrogenated monoalkylarene (A)-conjugated diene (B) block copolymer containing at least one A block and at least one B block wherein at least 1 percent by weight of said block copolymer has been functionalized with a monomer that does not polymerize easily;
   (b) 1-20 percent by weight of a plasticizer;
   (c) 1-40 percent by weight of polypropylene;
   (d) 10-85 percent by weight of a hydrated magnesium hydroxide which has been surface treated with a coupling agent.

2. The composition of claim 1 wherein the functionalized block copolymer is a functionalized hydrogenated styrene butadiene styrene block copolymer.

3. The composition of claim 1 wherein the functionalized block copolymer is functionalized with an acid or its derivative.

4. The composition of claim 1 wherein the functionalized block copolymer is functionalized with maleic anhydride.

5. The composition of claim 1 wherein the functionalized block copolymer is a functionalized selectively hydrogenated block copolymer selected from the group consisting of AB diblock copolymers and multi-block copolymers having at least two blocks A and at least one block B to which has been grafted an acid compound or its derivative wherein,
   (1) each A is predominantly a polymerized monoalkenyl aromatic hydrocarbon block having an average molecular weight of about 2,000 to 115,000;
   (2) each B is predominantly a polymerized conjugated diene hydrocarbon block having an average molecular weight of about 20,000 to 450,000;
   (3) the blocks A constituting 5-95 weight percent of the copolymer;
   (4) the unsaturation of the block B is reduced to less than 10% of the original unsaturation;
   (5) the unsaturation of the A blocks is above 50% of the original unsaturation.

6. The composition of claim 1 wherein the unfunctionalized block copolymer is an S—EB—S block copolymer.

7. The composition of claim 1 wherein the coupling agent is a fatty acid metal salt.

8. The composition of claim 1 wherein the coupling agent is an oleate.

9. The composition of claim 1 wherein the coupling agent is a separate.

10. The composition of claim 1 wherein the coupling agent is a maleate.

11. The composition of claim 1 wherein the coupling agent is a silane.

12. The composition of claim 1 wherein the coupling agent is a titanate.

13. The composition of claim 1 wherein the coupling agent is a zirco-aluminate.

14. The composition of claim 1 wherein the plasticizer is a mineral oil.

15. The composition of claim 1 wherein the plasticizer is a styrene butadiene diblock copolymer.

16. The composition of claim 1 wherein the hydrated magnesium hydroxide has a mean secondary particle size of about 0.6 to about 1.2 microns.

17. The composition of claim 1 wherein the hydrated magnesium hydroxide has a crystalline aspect ratio greater than 4.

18. The composition of claim 1 wherein the block copolymer is a hydrogenated styrene-butadiene-styrene block copolymer, the plasticizer is a mineral oil, the polypropylene is homopolypropylene and the hydrated magneium hydroxide has been surface treated with an oleate coupling agent.

* * * * *